United States Patent [19]

Braun et al.

[11] Patent Number: 4,618,665

[45] Date of Patent: Oct. 21, 1986

[54] PROCESS TO PREPARE 2-PHENYLPROPYL CONTAINING POLYDIORGANOSILOXANES

[75] Inventors: Joseph T. Braun; Schuyler B. Smith, both of Midland, Mich.

[73] Assignee: Dow Corning Corporation, Midland, Mich.

[21] Appl. No.: 818,150

[22] Filed: Jan. 13, 1986

[51] Int. Cl.[4] ............................................. C08G 77/04
[52] U.S. Cl. ...................................... 528/25; 528/33; 528/43; 556/459; 556/462; 556/463
[58] Field of Search ....................... 556/459, 462, 463; 528/25, 33, 43

[56] References Cited

U.S. PATENT DOCUMENTS 3,088,964  5/1963  Ryan ................................. 260/448.2
4,269,993  5/1981  Ohtake et al. ....................... 556/450
4,537,983  8/1985  Seiler et al. ......................... 556/479

Primary Examiner—Melvyn I. Marquis
Attorney, Agent, or Firm—Edward C. Elliott

[57] ABSTRACT

A method of preparing a copolymer of methyl(2-phenylpropyl)siloxy units and dialkylsiloxy units is disclosed. The method hydrolyzes methyl(2-phenylpropyl)dichlorosilane to yield a reaction product of primarily methyl(2-phenylpropyl)disiloxanediol, then copolymerizes the reaction product with dialkylcyclosiloxane to give the copolymer. The copolymer has a crystallinity point of less than −50° C. It is useful in producing silicone elastomers and sealants having a comparably low crystallinity point.

15 Claims, No Drawings

PROCESS TO PREPARE 2-PHENYLPROPYL CONTAINING POLYDIORGANOSILOXANES

BACKGROUND OF THE INVENTION

1. Field of the Invention

This invention is related to a method of hydrolyzing an organosiloxane of the formula methyl(2-phenylpropyl)dichlorosilane to produce a reaction product consisting primarily of methyl(2-phenylpropyl)disiloxanediol, and its subsequent cohydrolysis with dimethylcyclosiloxane to produce a hydroxyl endblocked copolymer.

2. Background Information

U.S. Pat. No. 3,088,964, issued May 7, 1963 to Ryan shows the reaction of alpha-methylstyrene with either monomeric or polymeric organosiloxanes to produce 2-phenylpropyl substituted compounds in good yield. He teaches reacting alpha-methylstyrene with

$$R_xHSiCl_{3-x}$$

in the presence of chloroplatinic acid to give a silane of the formula

$$[CH_3CH(C_6H_5)CH_2]R_x SiCl_{3-x}.$$

He states that copolymers can be prepared by cohydrolyzing one or more of the aforesaid silanes with one or more silanes of the formula

$$R'_mH_nSiCl_{3-x}$$

using conventional hydrolysis techniques. He then discusses making organosiloxane rubbers from the copolymers.

U.S. Pat. No. 4,269,993, issued May 26, 1981 to Ohtake, Koga, and Terui, shows a diaralkyldichlorosilane. Their example 5 illustrates the hydrolysis of the silane in a water-diisopropyl ether mixture and the subsequent polymerization and endblocking of the hydrolysis product. There is no teaching concerning copolymers.

U.S. Pat. No. 4,537,983, issued Aug. 27, 1985, to Seiler et al. relates to a method of preparing 2-phenylethylchlorosilanes. Hydrogen chlorosilanes and styrene are used as starting products in the presence of benzothiazole. They teach that the yield is good using their procedure whereas only low yields are obtained using a procedure described in German Pat. No. 2,602,171, which uses nitrogenous compounds as promoters.

SUMMARY OF THE INVENTION

A method of preparing copolymers of methyl(2-phenylpropyl)siloxy radicals and dialkylsiloxy radicals is disclosed. The method first produces a reaction product containing a majority of methyl(2-phenylpropyl)disiloxanediol and then cohydrolyzes the reaction product with dialkoxycyclosiloxane using a potassium hydroxide catalyst to yield the copolymer.

It is an object of this invention to produce a silicone polymer which has a crystallinity point of lower than $-50°$ C.

It is an object of this invention to produce such a polymer without the incidental production of toxic byproducts.

DESCRIPTION OF THE INVENTION

This invention is a method of preparing hydroxyl endblocked copolymers with methyl(2-phenylpropyl)disiloxanediol and dialkylcyclosiloxane consisting essentially of (A) adding to a reaction vessel containing distilled water and water miscible solvent in a ratio of from about 1:2 to 2:1, methyl(2-phenylpropyl)dischlorosilane, at a slow rate with stirring so that the temperature is maintained between 20° C. and 45° C., and the maximum HCl concentration is 5 Normal, then (B) cooling to below 35° C. and separating the reaction product from the acidified water, then (C) dissolving the reaction product in solvent, then (D) washing with saturated sodium bicarbonate solution followed by distilled water to give a pH of about 7, then (E) removing solvent to give a product of primarily methyl(2-phenylpropyl)disiloxanediol, then (F) mixing with sufficient dialkylcyclosiloxane to give the desired mol ratio of radicals and heating, then (G) adding powdered potassium hydroxide and heating to equilibrate, then (H) removing the water from the composition by use of a water trap and heating to reflux, then (I) cooling rapidly to about 65° C. and neutralizing with $CO_2$, then (J) filtering and stripping under vacuum to yield a copolymer having the formula

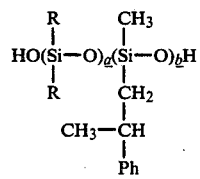

where Ph is phenyl, R is methyl, ethyl, propyl, or trifluoropropyl, a is from 3 to 500 and b is from 2 to 500 with a being at least equal to b.

Silicone sealants are often used because of their excellent properties at high and at low temperatures. In order to obtain a silicone sealant or silicone rubber having a crystallinity point of less than about $-50°$ C., it has been common practice to use a phenyl containing polymer, either a diphenylsilyl radical or an alkylphenysilyl radical. This has resulted in the desired low temperature properties, but has also presented a problem in that when these phenyl containing radicals are produced commercially, there may be byproducts present which have been suggested as being bioactive to mammals. This invention discloses a method of producing a silicone polymer which has good low temperature properties without also producing toxic byproducts.

The method of this invention first converts methyl(2-phenylpropyl)dichlorosilane to a product containing primarily methyl(2-phenylpropyl)disiloxanediol. The starting methyl(2-phenylpropyl)dichlorosilane is a known material which can be produced following the procedure of Ryan as shown in U.S. Pat. No. 3,088,964, issued May 7, 1963, which is hereby incorporated by reference to show methyl(2-phenylpropyl)dichlorosilane and the method of manufacture. The method of this invention hydrolyzes the methyl(2-phenylpropyl)dichlorosilane by adding it slowly to a mixture of distilled water and water miscible solvent. The relative amounts of distilled water and water miscible solvent are not critical except that there must be sufficient water to supply enough OH for the hydrolysis to occur and there must be sufficient water miscible solvent to yield the desired methyl(2-phenylpropyl)disiloxanediol. When only distilled water was used as the hydrolysis medium, the yield was zero. When toluene was used instead of a water miscible solvent, the yield of methyl(2-phenylpropyl)disiloxanediol was only 2 percent. The water miscible solvent is chosen from the group consisting of tetrahydrofuran and dioxane, with tetrahydrofuran being the preferred solvent.

The amount of the hydrolysis mixture of distilled water and water miscible solvent is critical to the hydrolysis procedure in that it has an effect upon the yield of the desired methyl(2-phenylpropyl)disiloxanediol. In order to obtain the desired product it is necessary that the concentration of HCl in the mixture remain below 5 Normal. It is preferred that the concentration of the acid be below 2 Normal. The more of the mixture of distilled water and water miscible solvent that is present in relation to the amount of methyl(2-phenylpropyl)dichlorosilane that is present, the lower the acid concentration will be. The use of about 3 times the weight of a mixture of distilled water and tetrahydrofuran as of the weight of the methyl(2-phenylpropyl)dichlorosilane was found to be satisfactory for producing the desired methyl(2-phenylpropyl)disiloxanediol.

The temperature of the hydrolysis is not known to be critical. The higher the temperature, the more rapid the reaction. A temperature of from about 20° C. to about 45° C. was found to be preferred for ease in controlling the reaction.

After the hydrolysis of step (A), the reaction product is removed from contact with the acidified water and neutralized in order to maintain the desired product. Because OH endblocked materials are not stable in the presence of acids, it is desirable that steps (B), (C), and (D) be carried out immediately after the completion of step (A). The cooling temperature of step (B) is not critical except that if the hydrolysis of step (A) was carried out at the upper end of the temperature range. It is more convenient to work with cooler materials for the next steps. The separation is carried out by placing the mixture in a separation vessel without mixing and allowing the layers to separate do to their incompatibility and difference in specific gravity and then removing the water layer. The reaction product is dissolved in solvent in step (C) to reduce its specific gravity so that a better washing step can take place. Toluene is the preferred solvent for this step, an amount sufficient to give a solids content of about 45 percent by weight was found to give good separation.

The solvent solution of reaction product is then washed thoroughly with a saturated sodium bicarbonate solution to neutralize any remaining acid present. Washing step (D) can be repeated if necessary until the product is at a pH of about 7.

The solvent is then removed in step (E) to give the product of primarily methyl(2-phenylpropyl)disiloxanediol. The solvent is preferably removed by stripping under vacuum. If the mixture is heated without vacuum to remove the solvent, a higher temperature is necessary and there is a possibility that the methyl(2-phenylpropyl)disiloxanediol will be condensed to some degree. The primary purpose of this stripping step is to remove the excess solvent and any water which may be present before the next step in the method. After the solvent is removed the product is composed of primarily methyl(2-phenylpropyl)disiloxanediol, with lesser amounts of methyl(2-phenylpropyl)trisiloxanediol, and methyl(2-phenylpropyl)cyclosiloxane.

Step (F) is the beginning of the cocondensation step. The amount of dialkylcyclosiloxane needed to give the desired ratio of methyl(2-phenylpropyl)siloxy and dialkylsiloxy radicals in the finished polymer is added to the stripped product of step (E). It has been found that a polymer having about 7.5 mol percent of the methyl(2-phenylpropyl)siloxy radicals in combination with dimethylsiloxy radicals will give a polymer having a crystallinity point of about $-110°$ C. The mixture is then heated and potassium hydroxide is added to catalyze the condensation. The mixture is heated before the catalyst is added because it makes it easier for the catalyst to be dissolved in the mixture. The catalyst should be added in the form of a fine powder to also aid in dissolving. The catalyzed mixture is then heated and allowed to condense until the desired degree of polymerization is obtained.

The amount of KOH added in step (F) controls the molecular weight of the copolymer produced because it acts as an endblocking ingredient as well as catalyst. Higher amounts of KOH result in lower molecular weight while lower amounts result in higher molecular weight. About 1 K+ ion per 145 silicon atoms gives a copolymer having about 100 siloxy units per molecule. The temperature of heating for the condensation step (G) is preferably 105° C. or less because this give a convenient rate of reaction. The temperature also has an effect upon the molecular weight achieved, the higher the temperature, the higher the molecular weight. A temperature of 150° C. gives a rapid polymerization and may result in a higher molecular weight than is desired. Preferred is heating to a temperature of about 105° C. for a period of about 2½ hours to equilibrate the mixture.

When the desired degree of polymerization is reached, the water is removed from the mixture through a water trap at reflux temperature. As soon as the water is removed, the reaction mixture is rapidly cooled to stop all reaction and exposed to $CO_2$ to neutralize the KOH. Gaseous $CO_2$ can be bubbled through the mixture, solid $CO_2$ can be added to the mixture, or the mixture can be poured over a bed of solid $CO_2$ in a container. After neutralization, the mixture is filtered to remove the potassium carbonate and the copolymer is stripped under vacuum to remove solvent and volatile byproducts to yield the desired copolymer.

The copolymer produced by the above method is hydroxyl endblocked. It is also possible to produce copolymers having other types of endblocking by the addition of suitable endblocking ingredients during step (F) so that they are attached to the polymer ends during the polymerization during step (G). Suitable endblocking ingredients, for example, would be hexamethyldisiloxane to give a trimethyl endblocked polymer and dimethylvinyldisiloxane to give a dimethylvinyl endblocked polymer. The OH endblocked polymer can also be reacted using known means to convert the OH endblocking to other endblocking groups such as acetoxy, alkoxy, amide, and amine.

The copolymer produced by the method of this invention is useful in the production of silicone elastomers and sealants. It can be used as the polymer of choice in any of the known methods of producing elastomers or sealants from silicone polymers. For example, the hydroxyl endblocked copolymer can be mixed with filler, such as calcium carbonate; crosslinker, such as n-propylorthosilicate; and catalyst, such as dibutyltindilaurate, to produce a sealant which cures to a silicone elastomer. The silicone elastomer will have a crystallinity point lower than −50° C. because of the presence of the 2-phenylpropyl radical in the copolymer.

The following examples are included for illustrative purposes only and should not be construed as limiting the invention which is properly set forth in the appended claims.

EXAMPLE 1

A 1 liter 3-necked flask equipped with a mechanical stirrer, a thermometer, and an addition funnel was used to contain 300 g of tetrahydrofuran and 400 g of distilled water. First, 233 g of methyl(2-phenylpropyl)dichlorosilane was slowly added to the mixture, with stirring, through the addition funnel. The maximum hydrochloric acid concentration was calculated to be 2.18N. The addition took about 30 minutes, the temperature of the mixture rising from 23° C. to 43° C. during the addition. The reaction product was allowed to cool for 1 hour to 32° C., then the reaction product was separated from the water layer with a separatory funnel and then diluted with 300 ml of toluene and washed with 300 ml of saturated sodium bicarbonate solution to remove any trace of hydrochloric acid. The reaction product was washed 4 more times with distilled water, then concentrated by use of a vacuum strip at a maximum pot temperature of 31° C. The stripped reaction product was analyzed as being about 56 percent by weight methyl(2-phenylpropyl)disiloxanediol, 23 percent methyl(2-phenylpropyl)cyclosiloxane, and 20 percent methyl(2-phenylpropyl)trisiloxanediol.

The above reaction product was then copolymerized with dimethylcyclosiloxane to produce a copolymer, the ratio of reaction product to dimethylcyclosiloxane being such as to give 7.5 mol percent of methyl(2-phenylpropyl)siloxy radicals in the copolymer. To prepare 2500 g of copolymer, 2092 g of dimethylcyclosiloxane was weighed into a reaction vessel and then 560.2 g of the above reaction product was added. The reaction product was 72.8 weight percent siloxane and 27.2 weight percent solvent. This mixture was then heated, with mixing, to the range of from 40° to 50° C., at which time 12.01 g of powdered KOH was slowly added. This was sufficient KOH to give a ratio of 1 KOH atom per 143 Si atom. The mixture was equilibrated for 2.5 hours at 105° C. A Dean-Stark water trap was then added and the temperature was increased to 116° C. and water was removed with the toluene reflux. The maximum temperature reached was about 130° C., which required about 30 minutes. About 8.5 ml of water was removed. The reaction vessel was then cooled rapidly with an ice water bath to a temperature of about 65° C.

The KOH in the mixture was then neutralized by pouring the mixture over a bed of crushed $CO_2$ and allowed to remain in contact overnight. The crude polymer was filtered through a 0.8 micron filter using a pressure funnel to yield a transparent, medium yellow material. This was then stripped under vacuum to a pot temperature of 150° C. and a head temperature of 90° C. under a vacuum of 250 microns. The copolymer yield was 69 weight percent based upon the starting materials. The copolymer was characterized by gas phase chromatography methods using an infrared detector at both 9.1 microns and at 6.2 microns to give the results shown in Table I.

The copolymer was then made into a room temperature silicone sealant base, which cures to a silicone elastomer when mixed with catalyst. A container was loaded with 184.5 g of the above copolymer, 14 g of n-propylorthosilicate, and stirred for 2 to 3 minutes, then 35 g of finely ground hydrated alumina filler was added and mixed for about ten minutes to give a smooth paste, at which time 105 g of diatomaceous earth was admixed in 4 equal portions. The mixture was blended for 20 minutes to insure uniformity and good dispersion of the filler, then 161 g more of the copolymer was added and mixed for 10 minutes to give a uniform sealant base.

A curable composition was then made by mixing 100 parts of the above sealant base with 10 parts of catalyst mixture containing, by weight, about 5 percent dibutyltindilaurate, 0.4 percent benzotriazole, 16 percent calcium carbonate filler, and the remainder polydimethylsiloxane fluid. This mixture was then subjected to a vacuum to remove the air and then formed into test slabs having a thickness of about 6.4 mm. The slabs were cured for 7 days at 23° C. and 50% relative humidity, then cut into test bars and tested for durometer in accordance with ASTM D 2240, tensile strength and elongation in accordance with ASTM D 412, and tear strength in accordance with ASTM D 624. The low temperature properties were measured by determining the crystallinity point with a differential scanning calorimeter. The results are shown in Table I.

COMPARATIVE EXAMPLE 1

A comparative example was prepared by following the teaching of the prior art and making a copolymer by cohydrolysis of methyl(2-phenylpropyl)dichlorosilane and dimethyldichlorosilane.

A 3 liter 3 necked flask equipped with a stirring rod, condenser, thermometer, and addition funnel was loaded with 2.16 of distilled water and 300 g of toluene, agitation was begun and a mixture of 50.13 g of methyl(2-phenylpropyl)dichlorosilane and 249.87 g of dimethyldichlorosilane was slowly added to the water-toluene mixture. The addition of the dichlorosilane mixture took about 30 minutes with the temperature starting at about 21° C. and ending at about 42° C. The reaction vessel was then cooled to 23° C. and the material separated in a separatory funnel and washed with distilled water and sodium bicarbonate solutions until the water showed neutral when tested with litmus paper. A gas-liquid chromotography analysis run on the reaction product showed 46 separate peaks.

The above mixture was equilibrated and condensed by heating 300 g of the mixture with 0.6 g of KOH to 100° C. and mixing for 8 hours under reflux. The mixture was then cooled overnight, then a Dean-Stark water trap was attached to the reaction vessel and the mixture was refluxed while removing water. The maximum temperature reached was 114° C. with 3.1 g of water removed. The solvent was then stripped off via the trap with a pot temperature of 126° C. After cooling overnight the pot residue was neutralized with $CO_2$ and the neutralized product was filtered as in Example 1. The copolymer was then stripped to a pot temperature of 180° C. under a vacuum of 250 microns to yield 84 g of material for a yield of 28 percent.

Because of the small amount of material obtained, a larger run was performed repeating the process described above. The product was analyzed as in Example 1 with the results shown in Table I.

This comparative copolymer was compounded into a silicone sealant and made into test slabs and tested in the same manner as in Example 1 with the results shown in Table I.

TABLE I

|  | Example 1 | Comparative Example 1 |
|---|---|---|
| GPC Data at 9.1 microns |  |  |
| Peak Molecular Weight | 41,014 | 79,008 |
| Number Average MW | 27,201 | 44,628 |
| Weight Average MW | 74,192 | 75,956 |
| GPC Data At 6.2 microns |  |  |
| Peak Molecular Weight | 39,138 | 79,008 |
| Number Average MW | 28,929 | 41,833 |
| Weight Average MW | 49,642 | 82,584 |
| Other Data |  |  |
| Percent hydroxyl | 0.1 | 0.03 |
| K+ content, ppm | <0.5 | 4.0 |
| Viscosity, Pa.s | 25.3 | — |
| Refractive Index | 1.4300 | — |
| Crystallinity Point, °C. | −109.7 | — |
| Sealant Properties |  |  |
| Durometer, Shore A | 31 | 0.0 |
| Tensile Strength, MPa | 2.00 | 0.23 |
| Elongation, percent | 203 | 327 |
| Tear Strength, kN/m | 3.7 | 1.2 |
| Heat aged 6 weeks at 200° C. |  |  |
| Durometer, Shore A | 25 | 80 |
| Tensile Strength, MPa | 1.08 | 0.54 |
| Elongation, percent | 205 | 189 |

COMPARATIVE EXAMPLE 2

A copolymer was prepared in the same manner as in Example 1 except a low viscosity hydroxyl endblocked polydimethylsiloxane was used in place of the reaction product containing the methyl(2- phenylpropyl)disiloxanediol. This copolymer was then converted into a sealant in the same manner as in Example 1 and tested in the same manner with the results shown in Table II.

TABLE II

| Polymer Properties |  |
|---|---|
| Crystallinity Point, °C. | −50 |
| Sealant Properties |  |
| Durometer, Shore A | 43 |
| Tensile Strength, MPa | 2.94 |
| Elongation, percent | 145 |
| Tear Strength, kN/m | 3.3 |
| Heat aged 6 weeks at 200° C. |  |
| Durometer, Shore A | 45 |
| Tensile Strength, MPa | 1.74 |
| Elongation, percent | 129 |

That which is claimed is:

1. A method of preparing hydroxyl endblocked copolymers with methyl(2-phenylpropyl)disiloxanediol and dialkylcyclosiloxane consisting essentially of (A) adding to a reaction vessel containing distilled water and water miscible solvent in a ratio of from about 1:2 to 2:1, methyl(2-phenylpropyl)dichlorosilane, at a slow rate with stirring so that the temperature is maintained between 20° C. and 45° C., and the maxiumum HCl concentration is 5 Normal, then (B) cooling to below 35° C. and separating the reaction product from the acidified water, then (C) dissolving the reaction product in solvent, then (D) washing with saturated sodium bicarbonate solution, followed by distilled water to give a pH of about 7, then (E) removing solvent to give a product of primarily methyl(2-phenylpropyl)disiloxanediol, then (F) mixing with sufficient dialkylcyclosiloxane to give the desired mol ratio of radicals and heating, then (G) adding powdered potassium hydroxide and heating to equilibrate, then (H) removing the water from the composition by use of a water trap and heating to reflux, then (I) cooling rapidly to about 65° C. and neutralizing with $CO_2$, then (J) filtering and stripping under vacuum to yield a copolymer having the formula

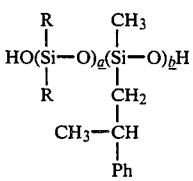

where Ph is phenyl, R is methyl, ethyl, propyl, trifluoropropyl, a is from 3 to 500 and b is from 2 to 500 with a being at least equal to b.

2. The method of claim 1 in which the water miscible solvent of step (A) is selected from the group consisting of tetrahydrofuran and dioxane.

3. The method of claim 2 in which the water miscible solvent is tetrahydrofuran.

4. The method of claim 3 in which the amount of water and tetrahydrofuran of step (A) is sufficient to keep the maximum HCl concentration at 2 Normal or below.

5. The method of claim 1 in which the solvent of step (C) is toluene in sufficient amount to allow separation of the dissolved reaction product from the wash water of step (D).

6. The method of claim 1 in which the solvent removal step (E) is by means of a vacuum strip at about 30° C.

7. The method of claim 1 in which the mixture of (F) is heated to a temperature of from 40° C. to 50° C.

8. The method of claim 1 in which sufficient powdered potassium hydroxide is added in step (G) to give about 1 K+ ion per 145 silicon atoms.

9. The method of claim 1 in which the heating of step (G) is for about 2½ hours at a temperature of about 105° C.

10. The product of step (E) of claim 1.

11. Methyl(2-phenylpropyl)disiloxanediol.

12. Methyl(2-phenylpropyl)trisiloxanediol.

13. The product produced by the method of claim 1.

14. The product of claim 13 in which R is methyl.

15. A silicone sealant produced from the product of claim 13.